United States Patent
Prise

(10) Patent No.: US 9,426,732 B2
(45) Date of Patent: *Aug. 23, 2016

(54) LOCATION INFORMATION ERASE ON SIM CARDS

(71) Applicant: AT&T Mobility II LLC, Atlanta, GA (US)

(72) Inventor: Michael Edward Prise, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,420

(22) Filed: Jul. 13, 2015

(65) Prior Publication Data

US 2016/0014687 A1 Jan. 14, 2016

Related U.S. Application Data

(60) Continuation of application No. 14/320,678, filed on Jul. 1, 2014, now Pat. No. 9,084,083, which is a continuation of application No. 13/327,873, filed on Dec. 16, 2011, now Pat. No. 8,768,413, which is a (Continued)

(51) Int. Cl.
*H04M 1/00* (2006.01)
*H04W 8/02* (2009.01)
(Continued)

(52) U.S. Cl.
CPC ........... *H04W 48/18* (2013.01); *H04B 1/3816* (2013.01); *H04W 8/02* (2013.01); *H04W 48/16* (2013.01); *H04W 60/00* (2013.01); *H04W 64/00* (2013.01); *H04W 4/00* (2013.01)

(58) Field of Classification Search
CPC ...... H04W 8/02; H04W 48/16; H04W 64/00; H04W 48/18
USPC ............ 455/432.1, 432.3–435.2, 514, 556.1, 455/557–558, 455, 160.1–160.2, 455/166.1–166.2, 168.1, 180.1, 414, 455/417–420, 422–425, 451–452, 466, 517, 455/560, 550.1, 404.2, 552.1, 440, 496.1, 455/496.2
See application file for complete search history.

(56) References Cited

U.S. PATENT DOCUMENTS

| 5,898,783 A | 4/1999 | Rohrbach |
| 5,946,634 A | 8/1999 | Korpela |

(Continued)

OTHER PUBLICATIONS

U.S. Office Action dated Nov. 19, 2014 in U.S. Appl. No. 14/320,678.

(Continued)

*Primary Examiner* — Pablo Tran
(74) *Attorney, Agent, or Firm* — Hartman & Citrin LLC

(57) ABSTRACT

Methods and systems including non-transitory computer-readable storage media, for selectively erasing data stored at a wireless device are disclosed. The media includes instructions that, when executed by a processor, cause the processor to perform a method including comparing a particular service provider identified by the data stored at the wireless device to at least one favored service provider selected from a group of favored service providers consisting of a home service provider and a preferred service provider other than the home service provider. The instructions further, when executed by a processor, cause the processor to erase, if the particular service provider is not one of the favored service providers, the data stored at the wireless device.

20 Claims, 4 Drawing Sheets

Related U.S. Application Data division of application No. 12/181,979, filed on Jul. 29, 2008, now Pat. No. 8,140,118, which is a division of application No. 11/472,873, filed on Jun. 21, 2006, now Pat. No. 7,406,312, which is a division of application No. 09/742,313, filed on Dec. 21, 2000, now Pat. No. 7,089,036.

(60) Provisional application No. 60/237,440, filed on Oct. 3, 2000.

(51) Int. Cl.

| | | |
|---|---|---|
| *H04W 48/18* | (2009.01) | |
| *H04W 48/16* | (2009.01) | |
| *H04W 64/00* | (2009.01) | |
| *H04B 1/3816* | (2015.01) | |
| *H04W 60/00* | (2009.01) | |
| *H04W 4/00* | (2009.01) | |

(56) References Cited

U.S. PATENT DOCUMENTS

| | | | |
|---|---|---|---|
| 5,950,130 A | 9/1999 | Coursey | |
| 6,115,617 A | 9/2000 | Ib | |
| 6,185,436 B1 | 2/2001 | Vu | |
| 6,324,394 B1 | 11/2001 | Vazvan | |
| 6,387,027 B1 | 5/2002 | Bodin | |
| 6,463,055 B1 | 10/2002 | Lupien et al. | |
| 6,480,725 B2 | 11/2002 | Cassidy et al. | |
| 6,526,267 B1 | 2/2003 | Jokimies et al. | |
| 6,603,968 B2 | 8/2003 | Anvekar et al. | |
| 6,757,539 B2 | 6/2004 | Kaibel et al. | |
| 7,042,855 B1 | 5/2006 | Gilchrist et al. | |
| 7,089,001 B2 | 8/2006 | Leung et al. | |
| 7,096,014 B2 | 8/2006 | Haverinen et al. | |
| 7,155,222 B1 | 12/2006 | Jain et al. | |
| 7,269,638 B2 * | 9/2007 | Vestergaard | H04L 29/06 709/219 |
| 7,328,016 B2 | 2/2008 | Buckley | |
| 7,363,056 B2 * | 4/2008 | Faisy | H04W 8/205 455/410 |
| 7,603,360 B2 | 10/2009 | Ramer et al. | |
| 7,877,112 B2 * | 1/2011 | Lan | H04M 1/72525 379/357.01 |
| 7,894,847 B2 | 2/2011 | Kuhn | |
| 7,912,458 B2 | 3/2011 | Ramer et al. | |
| 8,036,991 B2 | 10/2011 | Kuhn et al. | |
| 8,054,971 B2 | 11/2011 | Weiner | |
| 8,131,271 B2 | 3/2012 | Ramer et al. | |
| 8,131,888 B2 | 3/2012 | Skinner | |
| 8,437,802 B2 * | 5/2013 | Morikuni | H04W 12/08 380/247 |
| 8,819,659 B2 | 8/2014 | Ramer et al. | |
| 2004/0224684 A1 | 11/2004 | Dorsey et al. | |
| 2006/0009216 A1 | 1/2006 | Welnick et al. | |

OTHER PUBLICATIONS

U.S. Notice of Allowance dated Mar. 9, 2015 in U.S. Appl. No. 14/320,678.
U.S. Office Action dated Mar. 28, 2012 in U.S. Appl. No. 13/327,873.
U.S. Office Action dated Oct. 9, 2012 in U.S. Appl. No. 13/327,873.
U.S. Office Action dated May 10, 2013 in U.S. Appl. No. 13/327,873.
U.S. Office Action dated Oct. 31, 2013 in U.S. Appl. No. 13/327,873.
U.S. Notice of Allowance dated Feb. 26, 2014 in U.S. Appl. No. 13/327,873.
U.S. Office Action dated Dec. 24, 2008 in U.S. Appl. No. 12/181,979.
U.S. Office Action dated Jun. 29, 2009 in U.S. Appl. No. 12/181,979.
U.S. Office Action dated Feb. 2, 2010 in U.S. Appl. No. 12/181,979.
U.S. Notice of Allowance dated Oct. 7, 2011 in U.S. Appl. No. 12/181,979.
U.S. Office Action dated May 14, 2007 in U.S. Appl. No. 11/472,873.
U.S. Notice of Allowance dated Mar. 27, 2008 in U.S. Appl. No. 11/472,873.
U.S. Office Action dated Jul. 19, 2004 in U.S. Appl. No. 09/742,313.
U.S. Office Action dated Apr. 4, 2015 in U.S. Appl. No. 09/742,313.
U.S. Advisory Action dated Jul. 27, 2005 in U.S. Appl. No. 09/742,313.
U.S. Office Action dated Oct. 13, 2005 in U.S. Appl. No. 09/742,313.
U.S. Notice of Allowance dated Mar. 16, 2006 in U.S. Appl. No. 09/742,313.

\* cited by examiner

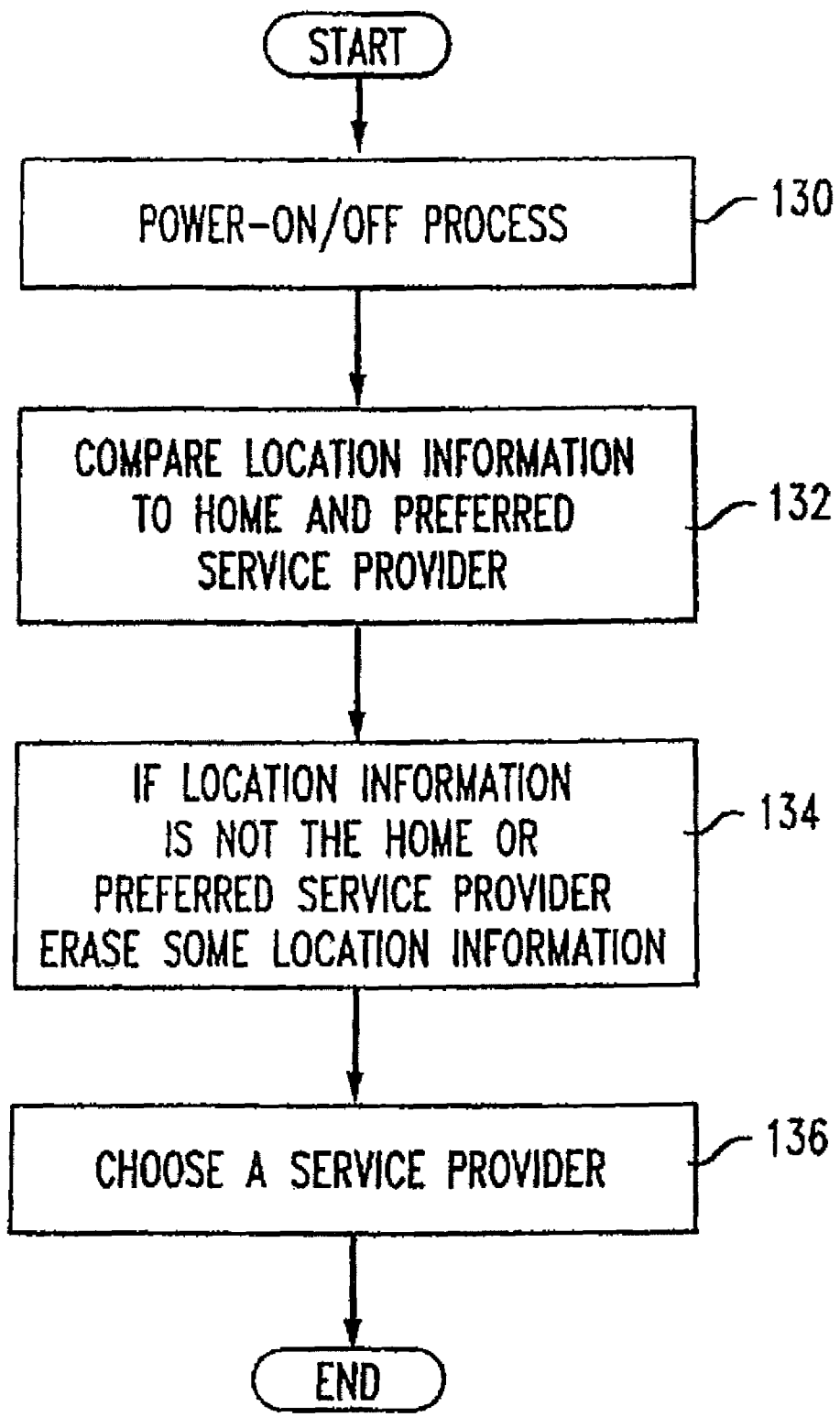

LOCATION INFORMATION ERASE ON SIM CARDS

CROSS REFERENCE TO RELATED APPLICATIONS

This application is a continuation of U.S. application Ser. No. 14/320,678, filed Jul. 1, 2014, now U.S. Pat. No. 9,084,083, which is a continuation of U.S. application Ser. No. 13/327,873, filed Dec. 16, 2011, now U.S. Pat. No. 8,768,413, which is a divisional of U.S. application Ser. No. 12/181,979, filed Jul. 29, 2008, now U.S. Pat. No. 8,140,118, which is a continuation of U.S. application Ser. No. 11/472,873, filed Jun. 21, 2006, now U.S. Pat. No. 7,406,312, which is a divisional of Ser. No. 09/742,313, filed Dec. 21, 2000, now U.S. Pat. No. 7,089,036, which claims benefit of 60/237,440, filed Oct. 3, 2000, the entireties of which are herein incorporated by reference.

BACKGROUND OF THE INVENTION

1. Field of the Invention

The present invention relates generally to wireless networks and more specifically to a system and method of erasing location information on a SIM card in a mobile telephone.

2. Discussion of Related Art

In a Global System for Mobile Communication (GSM) system, mobile phones use subscriber identifier modules (SIMs) associated with the mobile phone to store data. The SIM may be a check card or a plastic piece about 1 cm square that maybe plugged into the mobile phone. The SIM enables a user to inset the SIM into any mobile phone and use that phone with the user's account. Typically, the type of data stored includes the personal identification number for the user, lists of the optional functionality of the SIM, redial numbers, charges for time increments of phone use, subscriber data, secure data transmission parameters, roaming data and public land mobile network (PLMN) data. The present disclosure is directed to the use of the roaming data with its associated location information on the SIM card.

The SIM card is illustrated in FIG. 1. The wireless device 10 maybe a GSM mobile phone or any other wireless device such as a personal digital assistance or portable computer that uses a SIM card or a similar permanent or detachable data card that functions like a SIM card to store roaming data as described herein. The SIM card can be either an ID-1 SIM 12 or Plug-in SIM 14. The ID-1 SIM is a check card having a microchip or a plug-in card 14 that is about 1 cm square. These descriptions and dimension are not meant to be limited but only serve to generally describe a SIM card. Most SIM cards have the same ability to be inserted into a wireless device 10 such as a mobile phone and operate to provide parameters and data to operate the wireless device 10. The wireless device 10 communicates through an air interface with a base station 16 and an associated wireless network 18. The details of such a network are known to those of skill in the art, therefore, they are not discussed more herein.

The PLMN data includes the network color code (NCC), which is a three-bit-long code that identifies the PLMN. The NCC is part of the BSIC and is broadcast in the synchronization channel. Other PLMN parameters include the mobile country code (MCC), which is a three-digit identifier that uniquely identifies a country (not a PLMN) and the mobile network code (MNC) of the home PLMN.

The roaming data includes location updating status parameters for determining whether to update the location data, location area information (LAI), and the NCC preferred PLMNs. The roaming data also includes a list of preferred PLMNs or service providers that the mobile phone should select if more than one service provider is available and the home PLMN is not found.

When a GSM mobile phone is powered on, the mobile phone needs to select a service provider. The current PLMN service provider is stored on the SIM card as a part of the location information. The mobile phone checks the stored service provider in the location information upon power up before looking for the home service provider or another preferred service provider. If the mobile device finds a service provider using the PLMN service provider stored in the location information on the SIM, it will use that service provider.

The approach of first searching at power up for a service provider using the service provider stored on the SIM card causes several problems. First, suppose the user's previous use of the mobile phone was with a roaming service provider outside of the home-use area and the next power up by the user is in his or her home PLMN. In this scenario, if the roaming service provider also provides service in the home service area of the mobile user, the mobile phone may register with the roaming service provider when it should register with the user's home service provider.

Second, as discussed above, part of the roaming data includes the NCCs of preferred PLMNs with which the mobile phone should register if the home PLMN is not available. If the user is roaming outsider his or her home service area, and another more preferred service provider is listed in the roaming data, the mobile phone may still attain service from the service provider listed as the current service provider in the location information although that service provider is lower down or not even on the preferred service provider list.

Accordingly, for the foregoing reasons, there are drawbacks to the present system and method of searching for a service provider when a GSM mobile phone is powered up.

SUMMARY OF THE INVENTION

In order to address the deficiencies of the related art, the present invention is proposed for erasing the location information on SIM cards. The process of erasing the location information may occur on power up or during the power down routine, or under other circumstances. For example, a comparison maybe made between the service provider stored in the location information and the home service provider or a preferred service provider. If the home service provider or a preferred service provider is the service provider stored in the location information, then the location information would not be erased.

The present invention may take the form of a mobile phone, SIM card, method or medium storing a program for operating a series of steps for erasing part or all of the location information on a SIM card. An advantage of the present invention is to enable service providers to have some control in the service provider search routine.

BRIEF DESCRIPTION OF THE DRAWINGS

The foregoing advantages of the present invention will be apparent from the following detailed description of several embodiments of the invention with reference to the corresponding accompanying drawings, in which:

FIG. 5 illustrates a routine to selectively erase location information on a SIM card.

DETAILED DESCRIPTION OF THE INVENTION

Figure 1:
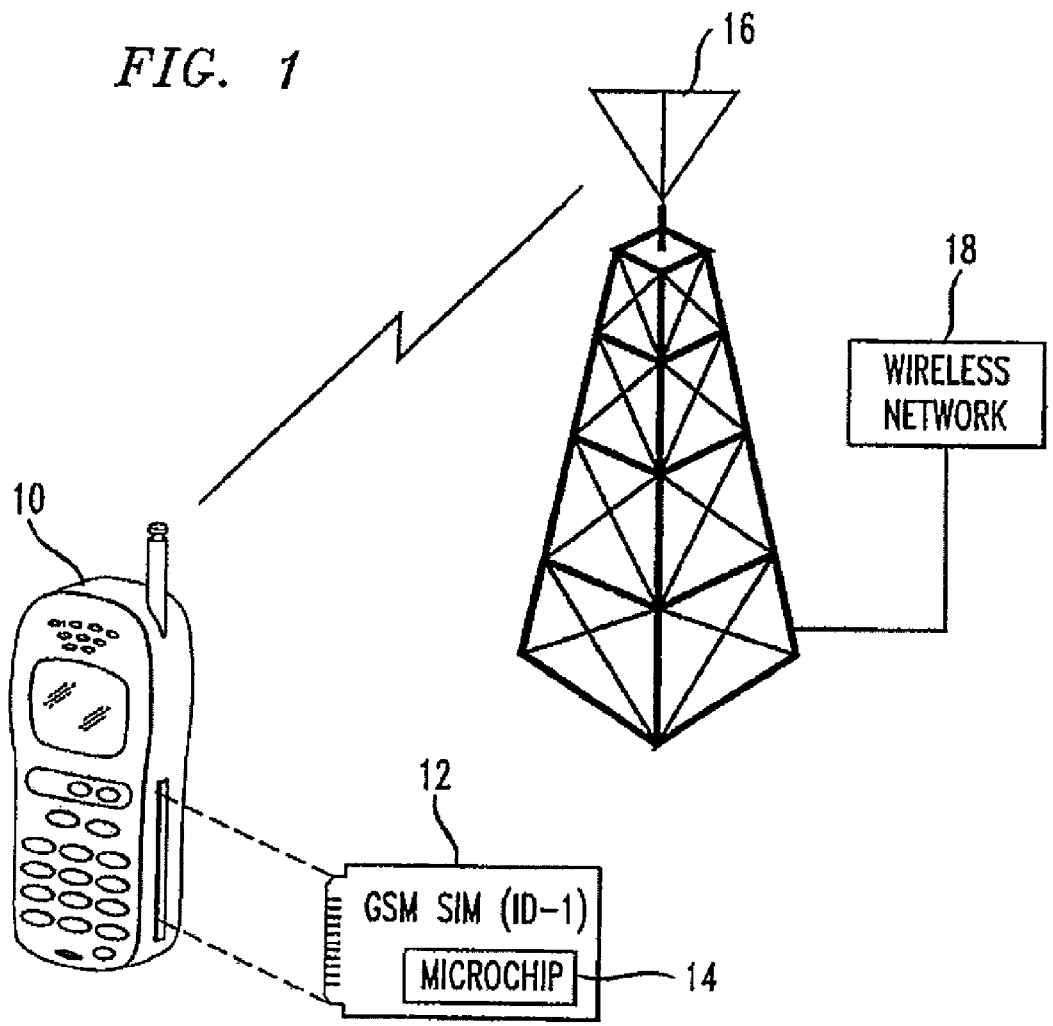
FIG. 1 illustrates a SIM card associated with a GSM mobile phone.

The present invention may be understood with references to the drawings. First, we turn to FIG. 2, which illustrates a wireless device 50 for use with the present invention. The wireless device 50 comprises a receiving slot 20 for a SIM card 22. The SIM card 22 communicates with the wireless device circuitry 24 that includes a central processor, clock and tone, internal bus system and keyboard control. In addition, the wireless device 50 includes a microphone 46, voice encoder 48, channel encoding, interleaving and burst generation circuitry 26, a ciphering module 28, a modulation unit 30, and an amplification unit 32. The signal is then transmitted to a base station (not shown) via an antenna 42. The antenna 42 also receives signals and uses a demodulator 40, deciphering unit 38, channel decoder, de-interleaver and re-formatting unit 36, and a voice decoding unit 34 to prepare received signals to provide to the user through a speaker 44. The system and method of the present invention may be programmed into the SIM card 22, programmed into the wireless device 50, provided via a recorded medium, or transmitted from a wireless network 18, for example, as shown in FIG. 1.

Figure 2:
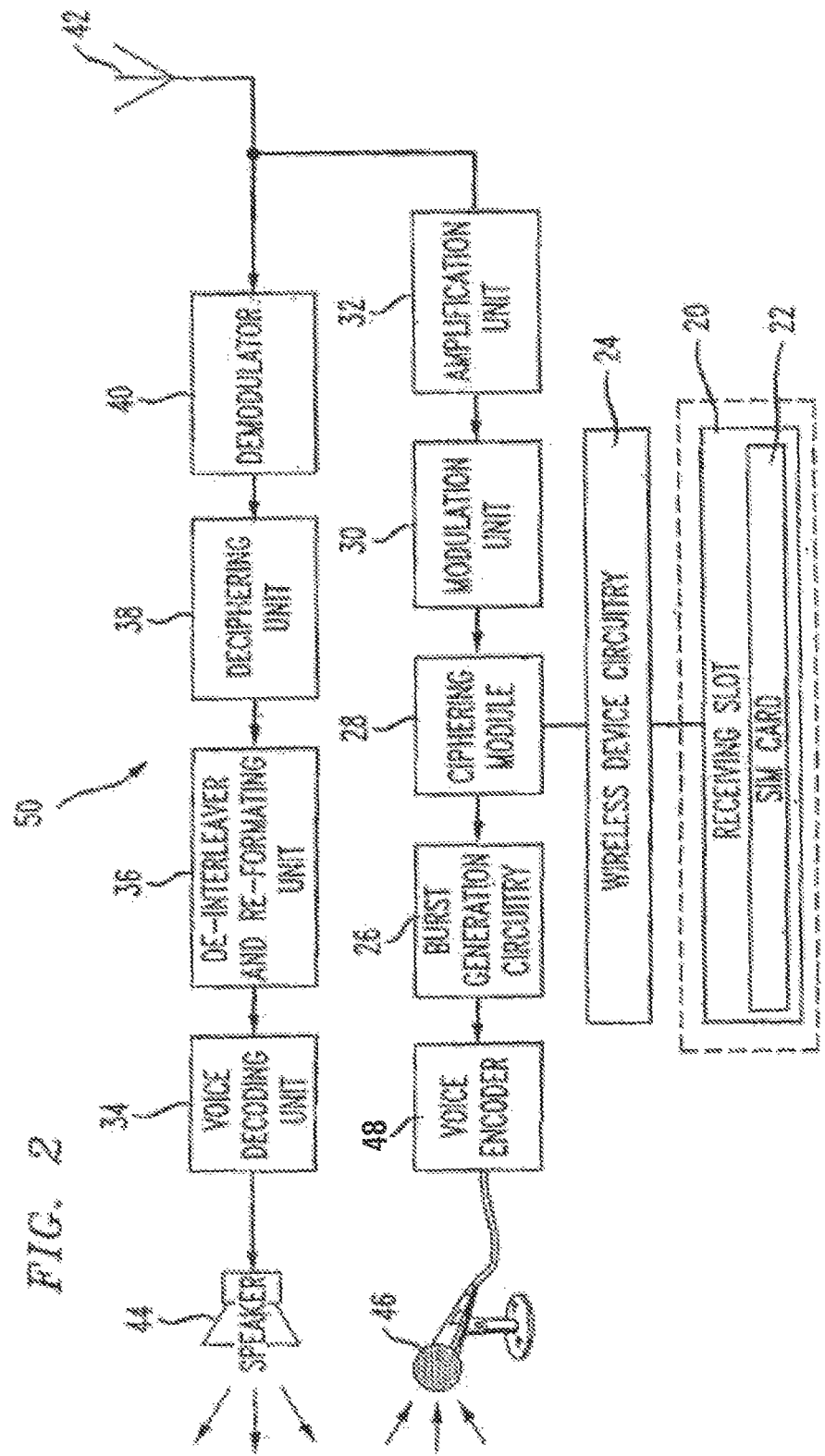
FIG. 2 illustrates a wireless device with a SIM card installed.

The specific hardware components as shown in FIG. 2 are not critical for the present invention. Any arrangement of internal components of a wireless device 50 may be used. The more important aspect of the invention is the operation of the hardware components to erase the information on the SIM card or on a similar component.

The present invention comprises different aspects of erasing location information from either the SIM 22 or other memory associated with the wireless device 50 in order to modify the first service provider the wireless device searches for on power up. The SIM 22 may have a first memory module and a second memory module for storing the various data necessary for its operation. It may further have other memory modules or storage locations for the various parameters, data or executable programs for operating routines according to the present invention. The location information may be any information associated with the most recent service provider used by the wireless device. Accordingly, the disclosure herein is not limited to the kind of location information normally associated with GSM networks.

In one aspect of the invention, the program that operates to erase location information may be stored on a recording medium associated with the use of a wireless device. Such a recording medium would comprise first memory that stores data associated with location information, and second memory that stores a program executable to erase at least some of the data associated with a most recently used service provider. The first memory of the recording medium may further store data associated with a home service provider, a preferred service provider or a list of preferred service providers. The recording medium may also include the second memory that stores a program that erases at least some of the data when the most recently wed service provider is not the home service provider or the preferred service provider. Such a recording medium may be a compact disk, floppy disk, computer chip, or other electronic recording means for storing a data erase routine according to the various aspects of the invention disclosed herein.

Figure 3:
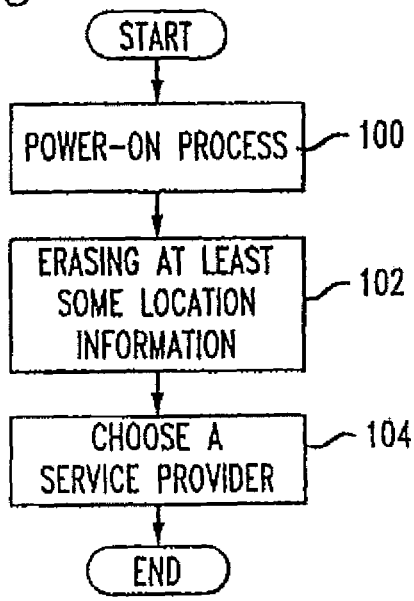
FIG. 3 illustrates a power up routine for erasing location information on a SIM card.

FIG. 3 shows a flow chart according to an embodiment of the invention. This aspect of the invention relates to the process occurring in the power up routine of the wireless device 50. According to this aspect of the invention, the power up routine begins (100) either by the user pressing the on button or some other means. During the power up routine, before the wireless device 50 begins looking for a service provider, the process involves erasing at least a portion of the location information (102) on the SIM 22. The location information includes at least in part the present or most recently used service provider.

Next, the routine chooses a service provider (104) by first looking to the location information for the most recently used service provider. Since the service provider listed in the location information has been erased, the routine next chooses a service provider (104) from the home service provider or a preferred service provider listed in the roaming data. In this manner, the home service provider may enhance its ability to direct its subscribers to particular roaming service providers.

Figure 4:
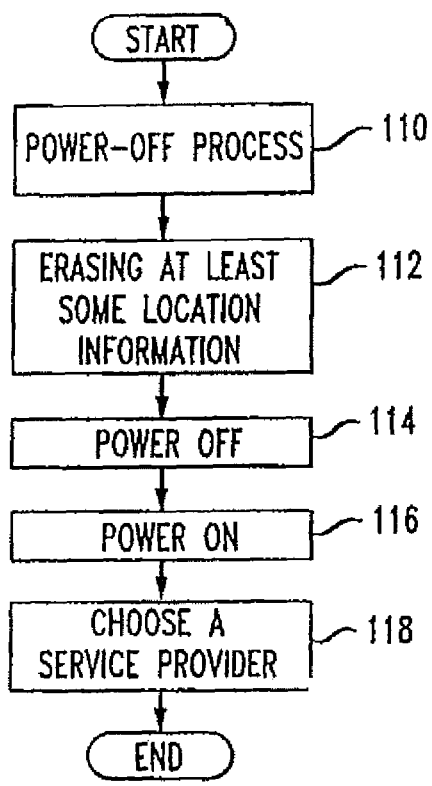
FIG. 4 illustrates power down routine for erasing location information on a SIM card.

FIG. 4 illustrates another aspect of the present invention in which at least some of the location information is erased during power off. As shown, as the power off routine begins (110), the process involves erasing at least some of the location information (112). After the location information is erased, the power off routine is completed (114). As the normal power up routine (116) executes on the power up, the routine chooses a service provider (118) by searching for a service provider in the location information in the SIM 22. However, no service provider will be listed so the power up routine proceeds to search for either the home service provider or a preferred service provider.

FIG. 5 illustrates another aspect of the present invention wherein the location information is selectively erased. In this process, either the power on or power off procedure begins (130). The routine compares the service provider stored in the location information with the home service provider and/or the list of preferred service providers in the roaming data (132). The comparison determines whether the service provider stored in the location information is the home service provider or one of the preferred service providers.

If the location information is not the home service provider or one of the preferred service providers, then at least some of the location information is erased (134). Then, the routine chooses the service provider according to its program (136). If step 130 involves the process shown in FIG. 5 being operated during a power off routine, then clearly step 136 is performed on the next power on routine executed by the user.

There are further variations to the routine outlined in FIG. 5. For example, when comparing the location information service provider to the home service provider and preferred service providers, a threshold value may be determined for the preferred service providers. In this case, suppose a list of four preferred service providers exists. Step 132 may involve determining whether the location information service provider is either the home service provider or one of the first two preferred service providers of the four listed preferred service providers. In that case, if the location information service provider is not the home or one of the first two preferred service providers, then the location information is erased (even though the location information service provider may be one of the third or fourth listed preferred service provider).

Furthermore, step 132 in FIG. 5, may also be modified to check only if the location information service provider is the home service provider, and if it isn't, then step 132 will erase the location information. The effect of the various aspects of the present invention is to use the concept of erasing the location information fully or in part to take advantage of the service provider search routine of the wireless device. In this manner, the wireless device can be directed more efficiently to an acceptable service provider. Thus, there may be other aspects of the invention not disclosed or discussed here involving ways of erasing the location information or other stored service provider information to take advantage of the service provider search routines. Any and all such modifications of this basic idea are considered as within the scope of the present disclosure.

Although the above description may contain specific details, they should not be construed as limiting the claims in any way. Other configurations of the described embodiments of the invention are part of the scope of this invention. For example, many of the embodiments are disclosed as being associated with the GMS system and SIM cards. However, other wireless networks with various wireless devices may also store the current or most recent service provider in a memory unit. The present invention therefore may be applicable to any device that searches for a service provider in generally the same manner as described herein. Furthermore, any functional language provided herein is only meant to describe how the invention may work and is not meant to limit the claims or be used as a substitute function in a doctrine of equivalents analysis. Accordingly, the appended claims and their legal equivalents should only define the invention, rather than any specific examples given.

What is claimed:

1. A method performed by a wireless device including a processor, the method comprising:
   comparing, at power down of the wireless device, by the processor, a service provider listed in location information with a list of preferred service providers; and
   erasing, by the processor, at least part of the location information in response to determining the service provider listed in the location information is not one of first preferred service providers in the list of preferred service providers.

2. The method of claim 1, wherein the location information is stored in a subscriber identity module card.

3. The method of claim 1, wherein the location information is stored in a storage unit in the wireless device.

4. The method of claim 1, wherein the location information is associated with a most recent service provider used by the wireless device.

5. The method of claim 1, further comprising:
   searching, at power up of the wireless device, by the processor, for a service provider in the location information; and
   searching, by the processor, in response to determining that the location information does not have any service provider, for a service provider in the list of preferred service providers at power up.

6. The method of claim 1, wherein erasing, by the processor, at least part of the location information in response to determining that the service provider listed in the location information is not one of the first preferred service providers in the list of preferred service providers comprises erasing, by the processor, at least part of the location information in response to determining that the service provider listed in the location information is not a home service provider.

7. The method of claim 1, wherein the location information comprises information associated with most recent service providers communicating with the wireless device.

8. The method of claim 1, further comprising searching, by the processor, for a service provider in the list of preferred service providers at power up and in response to at least part of the location information being erased.

9. A wireless device comprising:
   a receiving slot for receiving and communicating with a subscriber identity module card;
   a non-transitory computer-readable memory for storing a computer program; and
   a processor, wherein the computer program, when executed by the processor, causes the processor to perform operations comprising
     comparing, at power down of the wireless device, a service provider listed in location information with a list of preferred service providers, and
     erasing at least part of the location information in response to determining that the service provider listed in the location information is not one of first preferred service providers in the list of preferred service providers.

10. The wireless device of claim 9, wherein the location information is stored in the subscriber identity module card.

11. The wireless device of claim 9, wherein the location information is stored in the non-transitory computer-readable memory.

12. The wireless device of claim 9, wherein the location information is associated with a most recent service provider used by the wireless device.

13. The wireless device of claim 9, wherein the operations further comprise:
   searching, at power up of the wireless device, for a service provider in the location information; and
   searching, in response to determining that the location information does not have any service provider, for a service provider in the list of preferred service providers at power up.

14. The wireless device of claim 9, wherein erasing at least part of the location information in response to determining that the service provider listed in the location information is not one of the first preferred service providers in the list of preferred service providers comprises erasing at least part of the location information, by the processor, in response to a determination that the service provider listed in the location information is not a home service provider.

15. The wireless device of claim 9, wherein the location information comprises information associated with most recent service providers communicating with the wireless device.

16. The wireless device of claim 9, wherein the operations further comprise searching for a service provider in the list of preferred service providers at power up and in response to at least part of the location information being erased.

17. A non-transitory computer-readable storage device comprising instructions that, when executed by a processor of a wireless device, cause the processor to perform operations comprising:
   comparing, at power down of the wireless device, a service provider listed in location information with a list of preferred service providers; and erasing at least part of the location information in response to determining that the service provider listed in the location information is not one of first preferred service providers in the list of preferred service providers.

18. The non-transitory computer-readable storage device of claim 17, wherein the operations further comprise:

searching at power up of the wireless device, for a service provider in the location information; and searching, in response to determining that the location information does not have any service provider, for a service provider in the list of preferred service providers at power up.

19. The non-transitory computer-readable storage device of claim 17, wherein erasing at least part of the location information in response to determining that the service provider listed in the location information is not one of the first preferred service providers in the list of preferred service providers comprises erasing at least part of the location information in response to determining that the service provider listed in the location information is not a home service provider.

20. The non-transitory computer-readable storage device of claim 17, wherein the operations further comprise searching at power up and in response to at least part of the location information being erased, for a service provider in the list of preferred service providers.

* * * * *